United States Patent
Xiong

(10) Patent No.: US 7,430,526 B2
(45) Date of Patent: Sep. 30, 2008

(54) FUNCTIONAL PRICING FOR COMPUTER INTERNET MARKET

(76) Inventor: Wei Xiong, 9471 Cortada St., #F, El Monte, CA (US) 91733

( * ) Notice: Subject to any disclaimer, the term of this patent is extended or adjusted under 35 U.S.C. 154(b) by 0 days.

(21) Appl. No.: 11/466,928

(22) Filed: Aug. 24, 2006

(65) Prior Publication Data

US 2008/0052179 A1 Feb. 28, 2008

(51) Int. Cl.
*G06Q 30/00* (2006.01)

(52) U.S. Cl. ....................................................... 705/26

(58) Field of Classification Search ................... 705/26, 705/27, 37
See application file for complete search history.

(56) References Cited

U.S. PATENT DOCUMENTS

| | | | |
|---|---|---|---|
| 2002/0095391 A1 | 7/2002 | Swart et al. | |
| 2003/0023500 A1* | 1/2003 | Boies et al. | 705/26 |
| 2003/0065598 A1* | 4/2003 | Bunda | 705/36 |
| 2005/0144111 A1* | 6/2005 | Manstein et al. | 705/37 |
| 2006/0047581 A1* | 3/2006 | La Mura et al. | 705/26 |

OTHER PUBLICATIONS

Arlena Sawyers, Automotive News, Detroit, Jun. 19, 2006, vol. 80, Iss. 6208, p. 40, 1 pgs http://proquest.umi.com/pqdweb?did=1072376801&sid=2&Fmt=3&clientId=19649&RQT=309&VName=PQD.*
International Search Report for corresponding Foreign Application PCT/US07/18514, mailed Jan. 28, 2008.

* cited by examiner

*Primary Examiner*—Mark Fadok
*Assistant Examiner*—Mila Airapetian
(74) *Attorney, Agent, or Firm*—Lauson & Schewe LLP; Robert J. Lauson

(57) ABSTRACT

A method of conducting sales over the computer internet where the prices of the merchandises are dynamic functions of time instead of static rational numbers. In one embodiment, this method and system is a free market place that's able to conduct single-unit or multiple-unit sales of products and services from multiple sellers. In this market place, negotiation of the price does not require either side to make arbitrary offers, and further, with a large pool of prospect buyers, the true, current market value of the on sale products and services can be automatically reflected and updated through the purchases made.

6 Claims, 1 Drawing Sheet

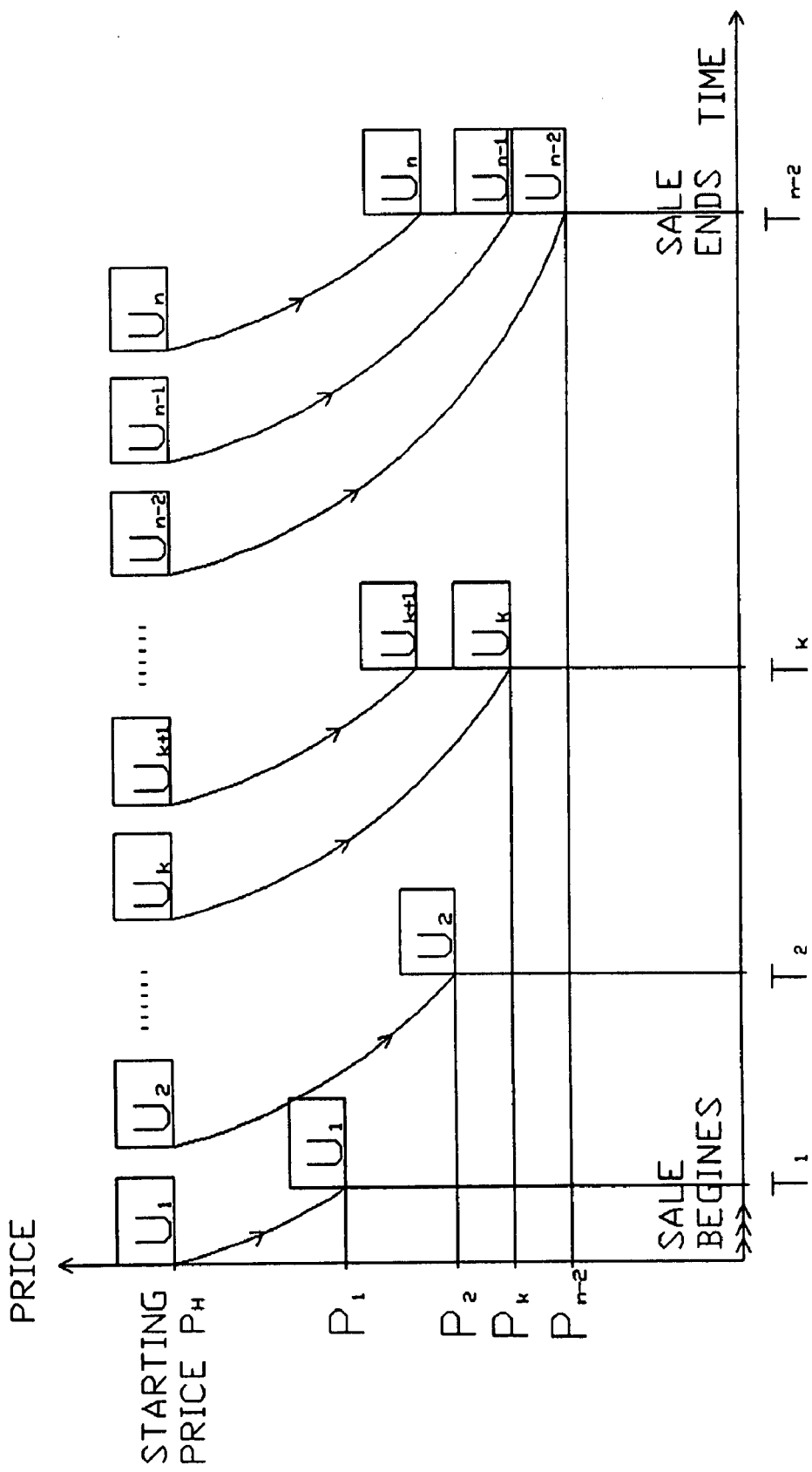

FUNCTIONAL PRICING FOR COMPUTER INTERNET MARKET

FIELD OF INVENTION

The present invention generally relates to a method and the corresponding system of conducting sales of goods and services over the computer internet. More particularly, the present invention relates to the method of automatically negotiating the price by listing the price not as a static number, but as a dynamic function of time of which the said goods or services are enlisted with the system.

BACKGROUND OF THE INVENTION

Ecommerce, the use of the Internet to conduct commercial transactions, is no longer a new concept. A vast number of websites now offer platforms for commercial activities between businesses (B2B), between businesses and consumers (B2C), and between consumers (C2C). While the internet provides a much wider medium for the pool of buyers and sellers and much easier ways of communication and financial transaction, the negotiation of the price is limited to traditional methods. Presently, there are mainly 3 ways of deciding the price for a certain goods or service during an internet transaction: seller's price, buyer's offer and auction based.

The first method is the most trivial, most conventional way to conduct sales. The seller names a price for the product or service offered, and the buyer decides whether to purchase at this price. The low-price search systems, such as www-.pricegrabber.com, provides the buyers means to find the best offer over the internet for a sought-after item, but the overall pricing is still based on the sellers' offer.

The second method is when the buyer makes a price offer for the sought-after item and the offer is accepted or rejected by the provider(s). An example of this method is: www.priceline.com.

In the third method, online auction, the seller lists starting price for the product or service offered for a certain period of time, and the buyers compete with each other by bidding a higher price for the item. At the end of the auction, the highest bidder becomes the winner of the item. An example of this method would be www.ebay.com.

These three systems expose disadvantage in promptly and accurately deciding the market value of the product or service offered. The first method lacks flexibility. The price reflects more of the seller's will than the value of the item. Any changes in price have to be implemented manually to adjust to market demand, and the effectiveness of the price change can't be guaranteed. The second method consists of the same problem but in the opposite direction. The item seeker has to take guesses of the suppliers' will regarding the item. The third method, while usually ends up with the proper market value of the item, lacks flexibility in time. For example, an item seeker willing to make the highest price may not have access to internet at the end of the auction period for the said item and thus lose the auction. Further, the seller has to list the item for a set period of time for auction, during which the item may be viewed but bids seldom came. This time of showcasing the item does not bring the seller or the buyer any economic benefit but has negative implications in delays.

While some systems of ecommerce employ combinations of the above methods, but they do not solve the fundamental problems of each pricing system. A new, better method of price negotiation that fully employs the capacity of computer internet and suits the need of both buyers and sellers is needed.

SUMMARY OF THE INVENTION

The present invention overcomes the above mentioned problem by recognizing and allowing price of a product or service as and to be a function of time. Generally, an item for sale is priced with a positive rational number which does not vary unless the determining agent makes an adjustment. According to this invention, typically, a seller of an item over the internet would name a higher-than-market-value initial price, and a specific fashion, usually defined with a mathematical function, for example, an exponential decay function, in which the price reduces as time elapses once the said item is enlisted for sale. This said price function is made known to all prospect buyers on the internet, and the concurrent price of the item is rounded to the smallest denomination of the currency in which the said item is associated with. This said concurrent price is the price for the item if a buyer wishes to make an immediate purchase of the said item. The whole process is feasible because of the nature of the computer and the internet. Hence in this system of the present invention, no manual adjustment of the price is needed, and the negotiation process is reduced to one step: when the price is right, the deal is sealed. With the vast number of prospect buyers the internet can reach, the true current market value of the said item is hence determined by the deal.

Furthermore, a prospect buyer may place an eventual bid for the item of interest should the said prospect buyer feel the concurrent price is still too high. The system of the present invention registers a bid for the said item at a lower price point but for a later time. Should the said item be still available, i.e. not bought off or received an earlier and higher bid, the said prospect buyer would then received the deal at his/her preferred price at the time when the price function reduces to the point of his/her said eventual bid. All eventual bids are kept undisclosed to the seller and other prospect buyers by the system of the present invention until the deal of the said bid is reached.

In case when two or more bids for a same item happen to have the same price-time point, the system of the present invention takes on the chronicle priority principle, i.e. the winner of the said item is the first prospect buyer among the group to make a bid.

The present invention may be applied to sales of multiple identical units in the following fashion: First, the seller sets a price function according to the system of the present invention, names the number of units of the item offered and defines a time separation between the initial points of variation, i.e. the time points where the price of the current units start changing in accord to the said price function, of each unit offered and the next. The said item is then offered to prospect buyers unit by unit according to the same price function but with a different initial point of variation. At any time, the unit with the lowest price of all still available units is the leading unit. A single unit transaction would follow the above mentioned steps and be conducted on the said leading unit. A multiple-unit buyer would receive the deal at the leading unit's concurrent price for all units desired, should the number of units desired not exceed the available units at the time of purchase. A prospect multiple-unit buyer wishing to place an eventual bid in hope to receive lower pricing for the item needs to bid for a price point for the leading unit and a quantity range in which the said prospect multiple-unit buyer would accept the deal. Should the leading unit reach the price point of the said bid and the available quantity at that time is no less than the minimum point of the quantity range given by the bidder, the system of the present invention would automatically complete the transaction, giving the maximum desired units or whatever is quantity that's still available. All eventual bids are to be undisclosed to the seller and other prospect buyers until the deal of the said bid is reached.

In case when two or more multiple-unit bids for the same item happened to have the same point and are all of suitable quantities, the first prospect buyer among the group would receive the deal. The remaining quantity is then reconsidered by the system of the present invention to be given to other qualifying bids, also following the chronicle priority principle.

Just like an auction, the market value is reflected through the deals, but the up-side-down approach of the present invention provides answers in a much faster fashion, and by allowing multiple-unit listing and exchange, the dynamic nature of the market value of the products and services is also reflected and quantified.

BRIEF DESCRIPTION OF THE DRAWINGS

FIG. 1 is a diagram of the preferred embodiment of the system of the present invention dealing with multiple-unit listing.

DETAILED DESCRIPTION

FIG. 1 shows a detailed map of the system of the present invention conducting sales of n units of a hypothetical item, where n is a positive integer no less than 1. U. sub. 1., U. sub. 2., U. sub. k., all the way to U. sub. n. are the said n units of product listed by a seller, where k is an integer between 1 and n. The horizontal axis represents the elapsing time, and the vertical axis represents the price of the product on sale. These said n units are listed with the system at the beginning of the sale, and are set to have different initial point of variation but a same starting price of P. sub. H. Further, they all follow identical paths in the price-time space that are represented by the curves in FIG. 1. These curves demonstrate that as time elapses, the price of each unit reduces according to the function that defines the curves. The following are examples of all possible scenarios that can happen to a prospect buyer of the said hypothetical item.

Scenario 1. As unit 1's price lowers to P. sub. 1, at time T. sub. 1., a prospect buyer, say buyer 1, makes the purchase for this unit.

Scenario 2. A prospect buyer, say buyer 2, places an eventual bit for 1 unit at price P. sub. 2., which is lower than P. sub. 1. However, unit 1 has been bought off at P. sub. 1. and T. sub. 1., and at the same time, unit 2 becomes the leading unit, and when unit 2 reaches P. sub. 2. at time T. sub. 2., the system automatically completes the transaction for buyer 2.

Scenario 3. A prospect buyer, say buyer 3, places an eventual bit for 1 unit at price P. sub. 2., but at the later time than buyer 2's bit. Buyer 3 would not receive unit 2 at T. sub. 2., but would have to wait for the next leading unit to reach P. sub. 2. to become a successful buyer.

Scenario 4. A prospect buyer, say buyer 4, places an eventual bit for 1 or 2 units at price P. sub. k. When unit k becomes the leading unit and reaches P. sub. k. at time T. sub. k., the system completes the transaction for buyer 4 and offers buyer 4 unit k and unit k-plus-1.

Scenario 5. A prospect buyer, say buyer 5, places an eventual bit for 3 units at price P. sub. k., but at the later time than buyer 4's bit. Buyer 5 would not receive unit k, unit k-plus-1, but would have wait for the next leading unit to reach P. sub. k, given that 3 or more units available, to become a successful buyer.

Scenario 6. A prospect buyer, say buyer 6, places an eventual bit for 5 to 7 units at price P. sub. n-minus-2. However, toward the end of the auction, when unit n-minus-2 reaches price P. sub. n-minus-2, there are only 3 units available. Hence buyer 6 would not become a successful buyer.

Scenario 7. A prospect buyer, say buyer 7, places an eventual bit for 2 to 5 units at price P. sub. n-minus-2, at a later time than buyer 6's bit. When unit n-minus-2 reaches price P. sub. n-minus-2., buyer 7 would receive the remaining 3 units, unit n-minus-2, unit n-minus-1 and unit n. at time T sub. n-minus-2, and the whole sale of the said item is then completed.

DEFINITIONS

CONCURRENT PRICE: The price point of a specific unit of an item on sale within the system of the present invention at the time of which a prospect buyer is viewing the said unit.

EVENTUAL BID: An offer to purchase a certain quantity range of an item that's on sale within the system of the present invention, not at the concurrent price, but rather, at a lower and later price-time point.

CHRONICLE PRIORITY PRINCIPLE: The rule which the system of the present invention stands by and follows, that when allocating available units of an item which received two or more qualifying bids at the same price point, the system would execute and fulfill bids one by one in the chronicle order of which these bids were registered with the system.

INITIAL POINT OF VARIATION: The time point where a unit of an item that's on sale within the system of the present invention starts to change its concurrent price by following the predetermined function of time.

I claim:

1. A method of selling products and services over the internet comprising the steps of:
   a seller setting a time-dependent price function, typically a mathematically well-defined decreasing function, for listing each of two or more units of the same product or service for sale;
   the seller listing the two or more units of the product or service for sale by setting a time interval in between each unit's initial point of price variation to offset one from the other in time the time-dependent price functions respectively corresponding to the units, and the seller sets the time interval substantially concurrently with the seller setting the time-dependent price function for each of the units; and
   wherein two or more of the units of the product or service having different concurrent prices are made available for instant combined purchase by a buyer each at the price of a leading one of the units.

2. The method in claim 1, wherein the seller lists the two or more units of the same product or service at the same starting price.

3. The method in claim 2, wherein the seller lists the multiple units by setting an equal time interval in between each unit's initial point of price variation.

4. The method in claim 1, wherein a buyer can make a bid for the said product or service for a later and lower price-time point, and when the price function reaches the said point, the system automatically completes the transaction, given that the products or services remain available.

5. The method in claim 1, wherein a buyer can make a bid for the two or more units of the same product or service for sale according to the price function of the first listed unit; the system automatically completes the transaction, given that the desired amount of said goods or services is still available.

6. A method of selling products and services over the internet comprising:
- setting a time-dependent decreasing price function for listing each of two or more units of the same product or service for sale to potential buyers;
- listing each of the two or more units for sale to potential buyers at different start times by setting a substantially equal time interval in between each unit's initial point of price variation to offset one from the other in time the time-dependent decreasing price functions respectively corresponding to the units, prior to the listing of the first of the two or more units of the same product or service for sale;
- initially listing the two or more units of the same product or service at the same starting price, and the two or more units are subject to commonly defined time-dependent decreasing time functions; and
- responsive to a buyer making a bid for the product or service of the two or more units for a later and lower price-time point and the time-dependent price function of one of the two or more units reaching the price-time point, the sale to the buyer being transacted provided that the product or service remains available;
- wherein two or more of the units of the product or service having different concurrent prices are made available for instant combined purchase by the buyer each at the price of a leading one of the units.

* * * * *